United States Patent
Lorente et al.

(10) Patent No.: US 12,146,682 B2
(45) Date of Patent: Nov. 19, 2024

(54) SYSTEMS AND METHODS OF ISOTHERMAL COMPRESSION FOR ENERGY STORAGE

(71) Applicants: Villanova University, Villanova, PA (US); Duke University, Durham, NC (US)

(72) Inventors: Sylvie Lorente, Philadelphia, PA (US); Adrian Bejan, Durham, NC (US)

(73) Assignees: Villanova University, Villanova, PA (US); Duke University, Durham, NC (US)

( * ) Notice: Subject to any disclaimer, the term of this patent is extended or adjusted under 35 U.S.C. 154(b) by 0 days.

(21) Appl. No.: 18/076,498

(22) Filed: Dec. 7, 2022

(65) Prior Publication Data
US 2023/0184447 A1 Jun. 15, 2023

Related U.S. Application Data

(60) Provisional application No. 63/288,012, filed on Dec. 10, 2021.

(51) Int. Cl.
*F24F 5/00* (2006.01)

(52) U.S. Cl.
CPC ............ *F24F 5/001* (2013.01); *F24F 5/0021* (2013.01); *F24F 2005/0025* (2013.01); *F24F 2203/021* (2013.01)

(58) Field of Classification Search
CPC .. F24F 5/001; F24F 5/0021; F24F 2005/0025; F24F 2203/021
See application file for complete search history.

(56) References Cited

U.S. PATENT DOCUMENTS

| | | | | |
|---|---|---|---|---|
| 2011/0100583 A1* | 5/2011 | Freund | ...................... | F02C 6/16 165/10 |
| 2012/0297772 A1* | 11/2012 | McBride | ................. | F01B 23/00 60/649 |
| 2013/0240068 A1* | 9/2013 | Samara-Rubio | ...... | H02J 15/006 137/571 |
| 2018/0283275 A1* | 10/2018 | Matsukuma | ............... | F02C 6/00 |
| 2021/0278044 A1* | 9/2021 | Saeedi | ...................... | F17C 1/06 |

FOREIGN PATENT DOCUMENTS

| | | | | |
|---|---|---|---|---|
| CN | 108518444 A | * | 9/2018 | ................ F16F 9/19 |
| FR | 3044751 A1 | * | 6/2017 | |
| WO | WO-2022069253 A1 | * | 4/2022 | |

OTHER PUBLICATIONS

WO-2022069253-A1 Translation (Year: 2022).*
CN-108518444-A Translation (Year: 2018).*
FR-3044751-A1 Translation (Year: 2017).*
Bejan, et al., "Design with Constructal Theory," 2008, 1-583, John Wiley & Sons, Inc., Hoboken, New Jersey.

* cited by examiner

*Primary Examiner* — David J Teitelbaum
(74) *Attorney, Agent, or Firm* — Duane Morris LLP

(57) ABSTRACT

A compressed gas energy storage system to provide isothermal compression/expansion for energy storage includes a housing defining an envelope including an internal volume; a phase change material (PCM) partially filling the internal volume; a dendritic (hierarchical) gas flow path through the PCM; and a piston driven by a drive mechanism and that moves relative to the PCM within the housing.

14 Claims, 5 Drawing Sheets

SYSTEMS AND METHODS OF ISOTHERMAL COMPRESSION FOR ENERGY STORAGE

CROSS REFERENCE TO RELATED APPLICATION

This application claims the benefit of U.S. Provisional Patent Application No. 63/288,012, filed Dec. 10, 2021, which is hereby incorporated by reference for all purposes as if fully set forth herein.

BACKGROUND

Industrial compression of permanent gases has been used for compression of low temperature refrigerants (e.g., cryogenics, liquefaction) and for the separation of gaseous mixtures into components needed in the chemical engineering industry. Gas compression technology has been developed with simultaneous advancements in turbine machinery, such as that used in steam turbine power plants. Demand for air compression for industrial activities such as chemical, construction, manufacturing, and storage continues to increase.

Compressed Air Energy Storage (CAES) is a process that utilizes renewable energy (e.g., wind, solar, etc.) to compress air. The compressed air is used to generate electricity from a turbine when needed, which mitigates the potential intermittency of a renewable energy source and allows matching of generation and demand. CAES can be used as an alternative to battery storage when storage demand extends beyond predetermined periods. Currently, only diabatic-CAES is used at an industrial scale, which has maintained a ratio of power generated during expansion to power spent during compression of 54% or less.

During classical diabatic compression, the air temperature rises significantly. After compression, compressed air must be cooled by contact with the ambient environment, which causes highly irreversible heat transfer (e.g., transfer across a significant temperature difference from the compressed air to ambient). Similar inefficiency occurs with expansion, during which air temperature drops below the ambient temperature and the expanding air warms up when in contact with the ambient environment. This heat flow results in a reduced power output from an electrical generator driven by the compressed air.

SUMMARY

CAES systems according to disclosed embodiments are configured to provide energy storage to allow mitigation of potential intermittency of a renewable energy source and allow matching of generation and demand, e.g., smoothing of peaks and valleys in the demand for electrical power. The CAES systems disclosed herein store power by compressing a gas such as air or any other suitable gaseous mixture (e.g., placing the energy into the compressed gas) during low demand periods. The compressed gas can be stored in a storage container, such as a tank or underground storage area. When power demand exceeds the amount of power being produced or capable of being produced by the associated energy source, the compressed gas is expanded through one or more turbines to drive generation of additional energy for delivery to the energy grid.

According to an embodiment, a compressed gas energy storage system provides isothermal compression/expansion for energy storage, the system includes a housing defining an envelope including an internal volume; a phase change material (PCM) partially filling the internal volume; a dendritic gas flow path through the PCM; and a piston driven by a drive mechanism and that moves relative to the PCM within the housing.

In an aspect, the system is configured to perform isothermal compression and expansion of a gaseous stream while maintaining compressed gas of the gaseous stream at a substantially constant temperature.

In an aspect, the PCM absorbs heat generated during compression of gas within the gas flow path, causing the PCM to transition from a solid state to a liquid state during and/or at an end of compression such that compressed gas maintains a constant temperature.

In an aspect, the PCM liquefies at a constant temperature during compression and solidifies at a same constant temperature during gas expansion.

In an aspect, the PCM has a melting/reacting point that is substantially similar to a temperature of a gas that is inlet to the housing to be compressed.

In an aspect, the housing is a cylinder defining an internal circumferential envelope.

In an aspect, the drive mechanism is coupled to a renewable energy source.

In an aspect, the PCM is a paraffin blend. In another aspect, the PCM is a salt.

In an aspect, the gas flow path is a dendritic gas flow paths providing a lung-like structure that maintains intimate thermal contact between a gas and the gas flow paths throughout an in and out movement of the piston within the housing.

In an aspect, the gas flow path is distributed throughout an entire volume of the PCM in a hierarchical structure, the hierarchical structure including a number of larger channels or paths, connected to a larger number of medium channels than the number of the larger channels which are, in turn, connected to a larger number of smaller channels than the number of the larger channels and the number of the medium channels.

In an aspect, the gas flow path is made of a metallic material.

The system can further include a thermal energy store that stores gases heated by the PCM during transition from a liquid to a solid.

In an aspect, the gas is air.

The system can be coupled to a heating, ventilating, and air conditioning system.

In another embodiment, a method of compressed gas energy storage includes driving a piston within an internal envelope of a housing towards a phase change material (PCM), which partially fills the housing, to compress gas in the housing within the PCM and a gas flow path in the PCM; opening a valve coupled to the internal envelope of the housing; and driving the piston away from the PCM to increase a volume of gas that flows into the internal envelope through the valve.

In an aspect, driving the piston towards the PCM causes the PCM to partially and/or completely transition from a solid phase to a liquid phase.

In an aspect, driving the piston away from the PCM causes the PCM to partially and/or completely transition from a liquid phase to a solid phase.

In an aspect, after the driving the piston away from the PCM the internal envelope is filled with the gas at atmospheric pressure and at a temperature higher than atmospheric temperature.

The method can further include driving the piston toward the PCM and the valve to expel the gas from the internal envelope through the valve without compression; and again, driving the piston away from the PCM to increase a volume of gas that flows into the internal envelope through the valve.

In an aspect, the gas flow path is distributed throughout an entire volume of the PCM in a hierarchical structure, the hierarchical structure including larger channels, or paths, connected to medium channels which are, in turn, connected to smaller channels.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
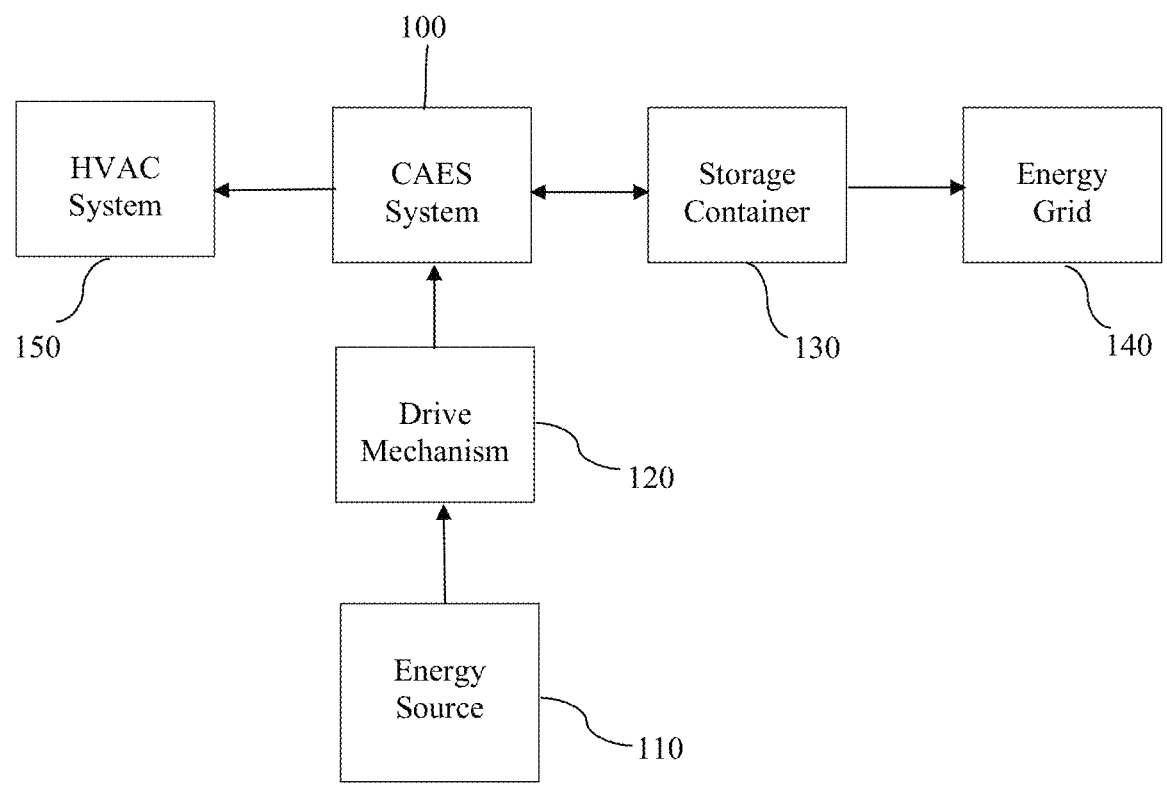
FIG. 1 is a block diagram of a CAES system.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship.

As used herein, the term "substantially" denotes elements having a recited relationship (e.g., parallel, perpendicular, aligned, etc.) within acceptable manufacturing tolerances. For example, as used herein, the term "substantially parallel" is used to denote elements that are parallel or that vary from a parallel arrangement within an acceptable margin of error, such as +/−5°, although it will be recognized that greater and/or lesser deviations can exist based on manufacturing processes and/or other manufacturing requirements.

In various embodiments, CAES systems and methods of using the CAES systems are disclosed. The disclosed CAES systems include a hierarchical structure configured to provide isothermal compression/expansion for energy storage. The CAES systems include a housing defining an internal volume (e.g., cylinder defining an internal space). The internal volume is at least partially filled with a phase change material (PCM) having gas flow paths embedded therein. The gas flow paths can include vasculatures or dendritic gas flow paths, providing a lung-like structure to the PCM. The lung-like structure including a series of decreasingly smaller diameter gas pathways in the gas absorbing material (i.e., PCM). The disclosed CAES system is configured to perform isothermal compression and expansion of a gaseous stream while maintaining the compressed gas at a substantially constant temperature, thereby increasing efficiency over conventional diabatic CAES systems.

FIG. 1 shows that a CAES system 100 can be configured to provide energy storage to allow mitigation of potential intermittency of an energy source, for example a renewable energy source 110, and allow matching of generation and demand, e.g., smoothing of peaks and valleys in the demand for electrical power. The CAES system 100 can store power by compressing a gas, e.g., air, (e.g., placing the energy into the compressed gas) during low demand periods (e.g., during periods when an associated energy source, such as a renewable energy source, is producing excess energy above the current demand). The compressed gas can be stored in a storage container 130, such as a tank or underground storage area. When power demand exceeds the amount of power being produced or capable of being produced by the associated energy source, the compressed gas or air is expanded through one or more piston and cylinder assemblies to drive generation of additional energy for delivery to the energy grid 140.

The disclosed CAES systems and methods perform compression and/or expansion of gases at temperatures close to the ambient temperature. As discussed below, the gas paths of the disclosed CAES systems provide a lung-like architecture embedded in a PCM. When a gas is forced into thermal contact with the gas paths and/or the PCM, the PCM liquefies or melts at a constant temperature during compression and solidifies or freezes at the same constant temperature during gas expansion. In some embodiments, the disclosed CAES systems separate the compressor stages from the additional stages in the system.

Figure 2:
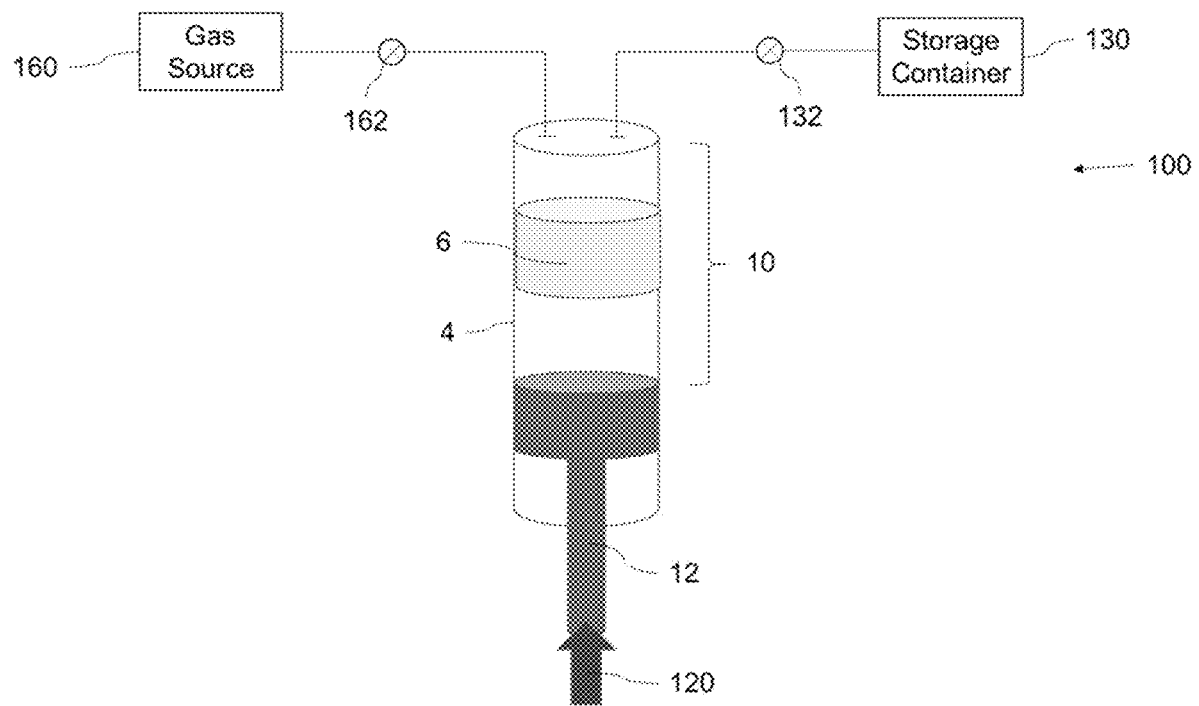
FIG. 2 illustrates a CAES system including an envelope at least partially filled with a phase change material defining dendritic air channels therein, in accordance with some embodiments.
Figure 3:
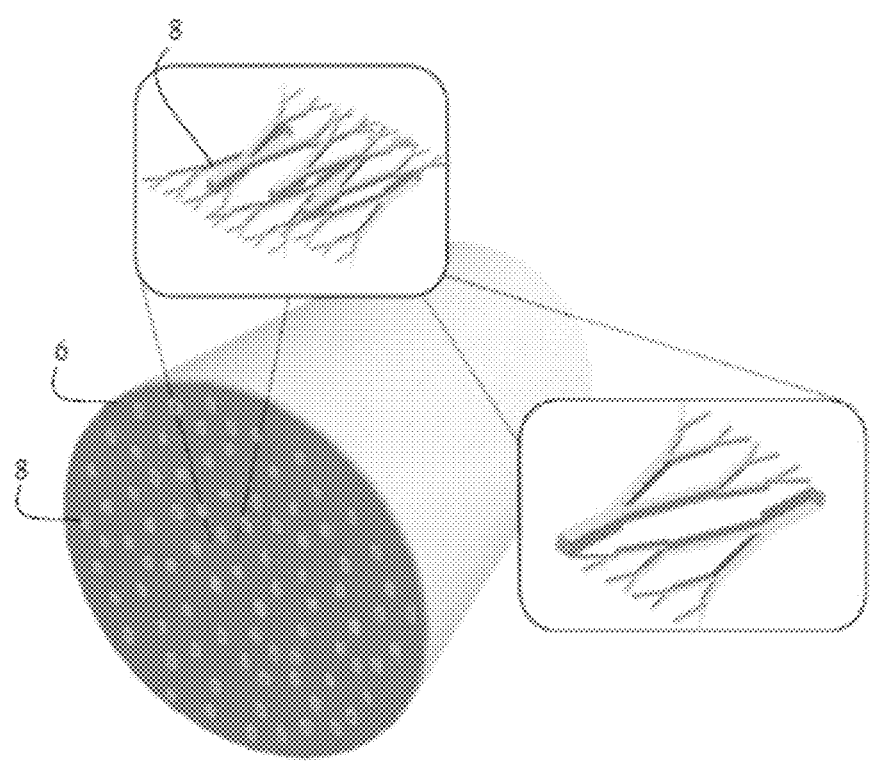
FIG. 3 illustrates the combined PCM and dendritic air channel structure of the CAES system of FIG. 2, in accordance with some embodiments.

FIGS. 2 and 3 illustrate a CAES system 100 including a housing 4 (shown as transparent for clarity to view the internal features) defining an envelope 10 at least partially filled with a PCM 6 defining a plurality of gas flow paths 8, in accordance with some embodiments. The housing 4 can be defined by any suitable structure. For example, in the illustrated embodiment, the housing 4 is a cylinder defining an internal circumferential envelope 10. Although specific embodiments are discussed herein, it will be appreciated that any suitably shaped housing 4 can be used. In some embodiments, a piston 12 is configured to move relative to the PCM 6 within the housing 4. The piston 12 can be driven by any suitable mechanism, such as a drive mechanism 120 coupled to an energy source 110, as illustrated in FIG. 1.

FIG. 2 shows that the CAES system 100 can also include a valve system that can include a storage valve 132 and a source valve 162. The storage valve 132 and the source valve 162 can be two-way valves or include a plurality of valves. As described in more detail below, the storage valve 132 can be connected between the envelope 10 and the storage container 130. After or during an inward or compression stroke of the piston 12, the storage valve 132 can allow gas compressed by the piston 12 within the envelope 10 to be transferred to the storage container 130. As also shown, the source valve 162 can be connected between the envelope 10 and a gas source 160. Before or during a reverse or expansion stroke of the piston 12, the source valve 162 can allow uncompressed gas from the gas source 160 to enter the envelope 10. In some embodiments, after or during an inward stroke by the piston 12, warmer gas can be expelled through the source valve 162. In some embodiments, compressed gas from the storage container 130 can be used to drive the piston 12 in the reverse stroke. The gas source 160 can be a plurality of gas sources or can be ambient air outside the CAES system 100.

In some embodiments, at least a portion of the envelope 10 includes (e.g., is filled with or contains) a PCM 6. The PCM 6 can include any suitable phase change material, such as, for example, a paraffin blend. The PCM 6 includes a plurality of gas flow paths 8 embedded therein, as shown in FIG. 2. The PCM 6 is configured to absorb heat generated during compression of gas within the gas flow paths 8, causing the PCM 6 to transition from a first state (e.g., solid state) to a second state (e.g., liquid state) during and/or at the end of the compression, allowing the compressed gas to maintain a constant temperature. In some embodiments, the PCM 6 is selected to have a melting/reacting point that is substantially similar to the inlet temperature of a gas to be compressed. Although embodiments are discussed herein including a phase change material, it will be appreciated that a thermochemical material, such as, for example, salt can be used as a material absorbing/releasing heat termed here as PCM 6.

The plurality of gas flow paths 8 can include vasculature and/or dendritic air flow paths providing a lung-like structure configured to maintain intimate thermal contact between a gas and the gas flow paths 8 throughout the compression-expansion cycle. The gas flow paths 8 can be defined by a second material, such as a metallic material, embedded (e.g., formed) within the PCM 6, or any other material that exhibits suitable heat exchange properties. The second material can include, but is not limited to, a copper material, a titanium material, an aluminum material, and/or combination materials. The PCM 6 and the integrated gas flow paths 8 can be defined by any suitable process, such as an additive manufacturing process as discussed below.

In some embodiments, the gas flow paths 8 within the PCM 6 are configured to provide a high-specific surface for heat exchange. The PCM 6 and the gas flow paths 8 can be selected to provide time matching of the phase change material (e.g., matching of thermal diffusion and convection). In some embodiments, dimensional parameters of the gas flow paths 8 (e.g., thicknesses, lengths, etc.) and/or the PCM envelope 10 are configured based on the time scales of thermal diffusion across air and melting during the compression stroke of the piston 12. The dimensional parameters and/or flow topology of the gas flow paths 8 can be selected to reduce a pressure drop along a respective one of the gas flow paths 8 during discharge of compressed air and/or during the intake of fresh gas in a stroke of the piston 12 that follows compression.

In some embodiments, the gas flow paths 8 include a porous system defining a three-dimensional dendritic network. The geometrical characteristics of the gas flow paths 8 can be configured to favor heat exchange and decrease friction loss within the gas flow paths 8. In some embodiments, the gas flow paths 8 are distributed throughout the entire volume of the PCM 6 in a hierarchical structure that, for example, resembles trees (i.e., trunk and branches) alternating with upside-down trees. The hierarchical structure is inspired by constructal law and includes larger channels, or paths, connected to medium channels which are, in turn, connected to smaller channels. As used herein, the terms "larger," "medium," and "smaller" are relative terms and the actual dimensions of the various channels will be based on other factors as discussed herein. The hierarchical structure can include a number of larger channels or paths, connected to a larger number of medium channels than the number of the larger channels which are, in turn, connected to a larger number of smaller channels than the number of the larger channels and the number of the medium channels. For example, from the larger channels to the medium and from the medium channels to the smaller channels, the diameters of the channels decrease stepwise by about 20%. The disclosed dendritic network requires less power to drive (e.g., flow) gas through the network than traditional parallel channels.

Figure 4A:
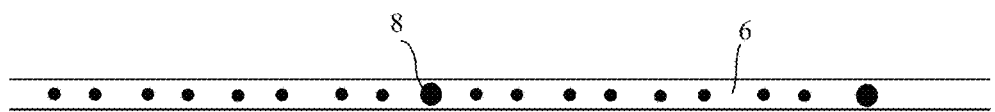
FIG. 4A to FIG. 4C are views showing exemplary dendritic networks that include the gas flow paths within the PCM.
Figure 4B:
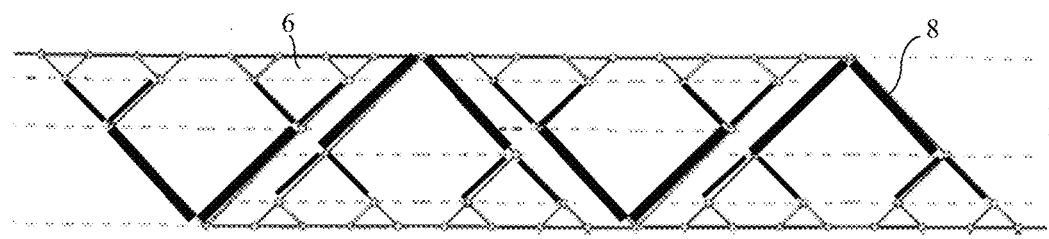
Figure 4C:
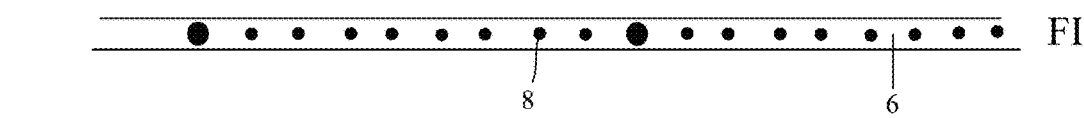
Figure 5:
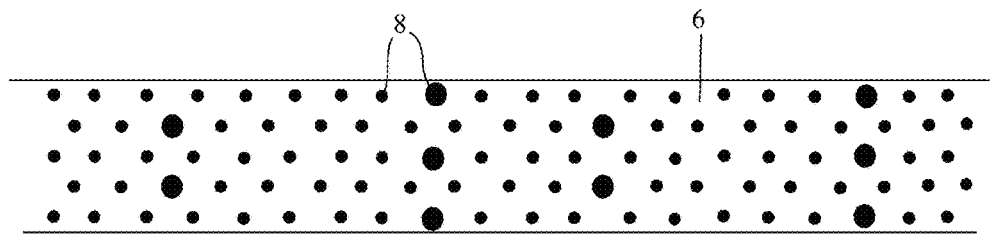
FIG. 5 is an end view showing exemplary staggered dendritic networks that include the gas flow paths within the PCM.

FIGS. 4A-4C and FIG. 5 are views showing exemplary dendritic networks that include the gas flow paths 8 within the PCM 6. FIGS. 4A, 4C, and 5 show end of slices of the PCM 6 where the black dots represent the gas flow paths 8. FIG. 4B is a cross sectional view of the PCM slice show in FIGS. 4A and 4C. FIG. 4B shows the hierarchical structure including the larger, medium, and smaller channels represented by the varied thickness of lines within the structure. The hierarchical structure includes a number of larger channels or paths, connected to a larger number of medium channels than the number of the larger channels which are, in turn, connected to a larger number of smaller channels than the number of the larger channels and the number of the medium channels. FIG. 5 is an end view of the PCM 6 showing an example of how the gas flow paths 8 can be staggered within the PCM 6.

In some embodiments, the envelope 10 defines a volume that accommodates density changes upon phase transitions without creating voids in the PCM 6 and which mitigates stresses on the walls of the gas flow paths 8 during expansion and compression of the PCM 6. In some embodiments, the PCM 6 includes a material having compatibility with metallic structures, high latent heat of fusion, and melting point close to the ambient.

In some embodiments, one or more portions of the CAES system 100 can be generated using an additive manufacturing process. For example, the envelope 4, PCM 6, gas flow paths 8, and/or any other portion of the CAES system 100 can be generated by an additive manufacturing process. Suitable additive manufacturing processes may include, but are not limited to, 3D printing, electron beam melting (EBM) such as copper-based EBM (Cu EBM), direct metal laser melting, etc. The additive manufacturing process can be selected to provide desired surface and bulk properties (e.g., electrical, thermal, and/or mechanical properties), provide targeted geometries of the PCM 6 and/or the gas flow paths 8, and/or provide optimization of selected material properties (e.g., density, hermeticity, mechanical, thermal, electrical, etc.). In some embodiments, one or more sensors, such as an x-ray and/or visible emission-based sensor, can be used to verify the additive manufacturing process.

In some embodiments, operation of the CAES system 100 occurs in a sequence of strokes of the piston 12. During a first stroke, externally generated power is used to power the drive mechanism 120 to drive the piston 12 in a compression direction towards the PCM 6. The gas within the housing 4 is compressed while in residence (and in slow flow) within the PCM 6 and the corresponding gas flow paths 8. At the end of the first stroke, the compressed gas occupies a small volume at the top of the housing 4. The top of the housing 4 can be opened and/or otherwise accessed via the storage valve 132 to transfer the compressed gas to a tank or other storage container 130. The PCM 6 can partially and/or completely transition from a first phase (e.g., solid phase) to a second phase (e.g., liquid phase) during the first stroke.

During a second stroke, the source valve 162 coupled to the internal envelope 10 of the housing 4 is opened to allow gas or ambient air to fill the internal envelope 10. The piston 12 is driven in a reverse direction away from the PCM 6 to increase the volume of gas that flows into the envelope 10. The gas or ambient air flow within the envelope 10 cools the PCM 6 and causes the PCM 6 to transition from the second phase (e.g., liquid phase) to the first phase (e.g., solid phase). At the end of the second stroke, the housing 4 is filled with gas or air at atmospheric pressure and at a temperature higher than ambient (due to heat exchange with the PCM 6).

In some embodiments, a third stroke is configured to purge the housing 4 of the gas having a slightly higher temperature than the ambient temperature. During the third stroke, the piston 12 is moved in a direction towards the PCM 6 and the source valve 162 (and/or a separate outflow valve) is kept open to allow the gas within the housing 4 to be expelled without compression. During the third stroke, the warmer gas is expelled from the housing 4.

During a fourth stroke, the piston 12 is again moved in a direction away from the PCM 6 with the source valve 162 open to allow inflow of gas or ambient air at the ambient temperature into the housing 4. The gas or ambient air is now at the ambient temperature and will require less energy to be compressed than the gas expelled during the third stroke (which was at a higher temperature and thus would require more energy to compress). After the fourth stroke, the CAES system 2 repeats the 1-2-3-4 stroke cycle to compress additional quantities of gas and store additional energy via stored compressed gas.

In some embodiments, the CAES system 100 can be configured to provide isothermal compression of a gas within the envelope 4. The CAES system 100 can be configured to reduce sources of irreversible heat transfer and/or loss, such as, for example, due to temperature difference between a gas to be compressed and the PCM 6, pressure drops during compression to and/or discharge from or intake to a cylinder, etc. During compression, the PCM 6 can be liquefied and, during expansion, the liquid PCM can be solidified. In some embodiments, the isothermal characteristics of the CAES system 100 can be expressed using a method of entropy generation minimization and exergy destruction maximization.

Figure 6:
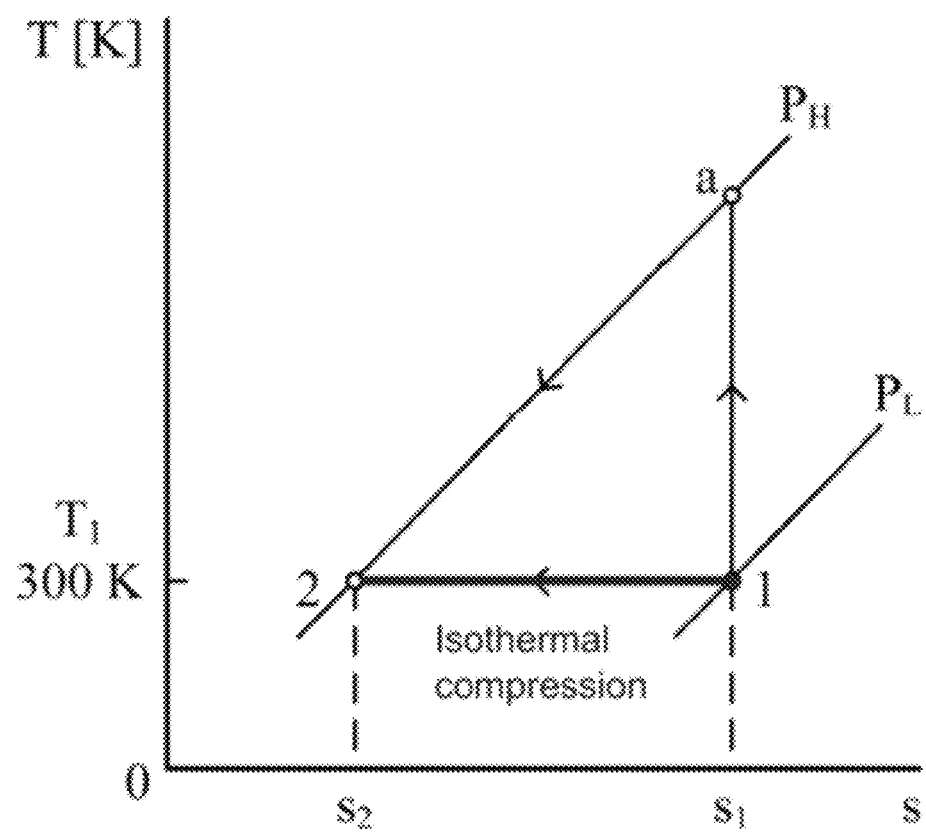
FIG. 6 is a chart illustrating the difference between adiabatic compression and isothermal compression, for a given compression ratio of the CAES system of FIG. 1, in accordance with some embodiments.

FIG. 6 is a chart illustrating the difference between adiabatic compression and isothermal compression, for a given compression ratio of the CAES system of FIG. 1. In FIG. 6, the x axis is entropy S, the y axis is temperature T, and pressure is P. Compressing a gas from a pressure $P_L$ and temperature $T_1$ to a pressure $P_H$ while maintaining the gas at temperature $T_1$ can happen during isothermal compression, as described with respect to embodiments of the present disclosure, or through an adiabatic process combined with a heat exchanger. Assuming a thermodynamically reversible process, adiabatic compression happens at a constant specific entropy $S_1$. Such an adiabatic process proceeds with a pressure increase $P_L$ to $P_H$ from point 1 to point a, leading to a corresponding temperature increase. In the adiabatic process, a heat exchanger is necessary to decrease the gas temperature while maintaining a constant pressure $P_H$, going from point a to point 2. The work necessary to transition a gas via path 1-a-2 is greater than the work needed to go from point 1 to point 2 at a constant temperature in the case of an isothermal compression.

In some embodiments, the CAES system 100 can be configured to be used in conjunction with and/or operated as a thermal energy store (TES). For example, in some embodiments, during a reverse stroke of the piston 12, environmental gases, e.g., air, is drawn into the envelope 4. The environmental gases are heated by the PCM 6 (which transitions from a liquid PCM to a solid PCM as heat is transferred into the environmental gases). The heated environmental gases can be collected for use in a TES system. For example, in some embodiments, the CAES system 100 can operate in conjunction with heating, ventilation, and air conditioning (HVAC) system 150, shown in FIG. 1, to provide the heated environmental gases to the HVAC heating stream and provide a corresponding reduction in energy consumption for the HVAC system/building. That is, a portion of the energy recovered from the compression process can be sent to the HVAC system 150.

In some embodiments, multiple CAES systems 100 can be coupled together and/or otherwise operate in tandem or sequence. For example, in some embodiments, a plurality of CAES systems 100 can be coupled to the same power generation source (e.g., the same renewable energy source) and coupled to the same compressed storage container 130. The plurality of CAES systems 100 operate in sequence to compress air and store it in the storage container 130 for later retrieval and power generation. Any number of CAES systems 100 can be coupled to the same energy source 110 and/or to the same storage container 130.

Although embodiments are discussed herein including gas flow paths 8 embedded within a PCM 6, it will be appreciated that, in some embodiments, the PCM 6 can be embedded within the gas flow paths 8. The gas flow paths 8 can define a multi-stage gas expansion system and can include one or more reheaters. The PCM 6 is embedded within the vascular structure of the gas flow paths 8 to provide heat exchange directly within the PCM 6.

In the case of air, the air compression needs to be followed by cooler air intake to re-solidify the PCM. Cooler air can be outdoor air at night, when power consumption is low, and power is available to be saved via CAES. Air expansion needs to be followed by warmer air intake to re-melt the PCM. Warmer air is outdoor air during the day, when power consumption is high, and the grid and needs CAES power. This condition is environment friendly, as weather matching and in synchronization with the diurnal cycle.

Although the subject matter has been described in terms of exemplary embodiments, it is not limited thereto. Rather, the appended claims should be construed broadly, to include other variants and embodiments, which may be made by those skilled in the art.

What is claimed is:

1. A compressed gas energy storage system to provide isothermal compression and expansion for energy storage, the system comprising:
   a housing defining an envelope including an internal volume;
   a phase change material (PCM) partially filling the internal volume;
   a dendritic gas flow path through the PCM; and
   a piston driven by a drive mechanism and that when driven moves relative to the PCM within the housing, wherein the gas flow path is distributed throughout an entire volume of the PCM in a hierarchical structure, the hierarchical structure including a number of larger channels or paths, connected to a larger number of medium channels than the number of the larger channels which are, in turn, connected to a larger number of smaller channels than the number of the larger channels and the number of the medium channels.

2. The system of claim 1, wherein the system is configured to perform isothermal compression and expansion of a gaseous stream while maintaining compressed gas of the gaseous stream at a substantially constant temperature.

3. The system of claim 1, wherein the PCM absorbs heat generated during compression of gas within the gas flow path, causing the PCM to transition from a solid state to a liquid state during and/or at an end of compression such that compressed gas maintains a constant temperature.

4. The system of claim 1, wherein the PCM liquefies at a constant temperature during compression and solidifies at a same constant temperature during gas expansion.

5. The system of claim 1, wherein the PCM has a melting point that is substantially similar to a temperature of a gas that is inlet to the housing to be compressed.

6. The system of claim 1, wherein the housing is a cylinder defining an internal circumferential envelope.

7. The system of claim 1, wherein the drive mechanism is coupled to a renewable energy source.

8. The system of claim 1, wherein the PCM is a paraffin blend.

9. The system of claim 1, wherein the PCM is a salt.

10. The system of claim 1, wherein the gas flow path is a dendritic gas flow paths providing intimate thermal contact between a gas and the PCM throughout a volume of the compressed gas energy storage system and throughout an in and out movement of the piston within the housing.

11. The system of claim 1, wherein the gas flow path is made of a metallic material.

12. The system of claim 1, further comprising a thermal energy store that stores gases heated by the PCM during transition from a liquid to a solid.

13. The system of claim 1, wherein the gas is air.

14. The system of claim 1 coupled to a heating, ventilating, and air conditioning system.

* * * * *